US011105376B2

United States Patent
Kirihara et al.

(10) Patent No.: US 11,105,376 B2
(45) Date of Patent: Aug. 31, 2021

(54) BEARING WITH MEASUREMENT FUNCTION

(71) Applicants: NEC CORPORATION, Tokyo (JP); TOHOKU UNIVERSITY, Miyagi (JP)

(72) Inventors: Akihiro Kirihara, Tokyo (JP); Masahiko Ishida, Tokyo (JP); Koichi Terashima, Tokyo (JP); Ryohto Sawada, Tokyo (JP); Eiji Saitoh, Miyagi (JP); Yasuyuki Oikawa, Miyagi (JP); Ryo Iguchi, Miyagi (JP); Masao Ono, Ibaraki (JP)

(73) Assignees: NEC CORPORATION, Tokyo (JP); TOHOKU UNIVERSITY, Miyagi (JP)

( * ) Notice: Subject to any disclaimer, the term of this patent is extended or adjusted under 35 U.S.C. 154(b) by 0 days.

(21) Appl. No.: 16/646,016

(22) PCT Filed: Aug. 3, 2018

(86) PCT No.: PCT/JP2018/029225
§ 371 (c)(1),
(2) Date: Mar. 10, 2020

(87) PCT Pub. No.: WO2019/049575
PCT Pub. Date: Mar. 14, 2019

(65) Prior Publication Data
US 2020/0263736 A1    Aug. 20, 2020

(30) Foreign Application Priority Data

Sep. 11, 2017  (JP) .............................. JP2017-173877

(51) Int. Cl.
*F16C 19/06*  (2006.01)
*F16C 19/18*  (2006.01)
(Continued)

(52) U.S. Cl.
CPC ............ *F16C 41/007* (2013.01); *F16C 19/06* (2013.01); *F16C 33/763* (2013.01);
(Continued)

(58) Field of Classification Search
CPC ...... F16C 19/06; F16C 19/186; F16C 19/522; F16C 19/525; F16C 33/763; F16C 33/765;
(Continued)

(56) References Cited

U.S. PATENT DOCUMENTS 6,593,733 B1 * 7/2003 Nicot .................... F16C 41/04
                                                    324/207.25
6,971,799 B2 * 12/2005 Sato ........................ B21B 31/07
                                                    384/448
(Continued)

FOREIGN PATENT DOCUMENTS

CN      101427115 A  *  5/2009
CN      204200868 U  *  3/2015  ............. F16C 37/00
(Continued)

OTHER PUBLICATIONS

International Search Report for PCT/JP2018/029225 dated, Oct. 23, 2018 (PCT/ISA/210).
(Continued)

*Primary Examiner* — Marcus Charles
(74) *Attorney, Agent, or Firm* — Sughrue Mion, PLLC

(57) ABSTRACT

In order to determine information about the generation of heat in a bearing (10) in a simple manner, a bearing (10) includes an outer ring (12) secured to a securing member, and an inner ring (11) provided on the inside of the outer ring (12) and secured to a shaft that rotates in the circumferential direction relative to the securing member. A thermal flow sensor (14) is provided as a coating on a securing-side surface that includes the outer ring (12), and generates a
(Continued)

thermoelectromotive force including information about frictional heat generated with the rotation of the shaft.

11 Claims, 9 Drawing Sheets

(51) Int. Cl.
F16C 19/52 (2006.01)
F16C 33/76 (2006.01)
F16C 33/78 (2006.01)
G01P 3/44 (2006.01)
F16C 41/00 (2006.01)

(52) U.S. Cl.
CPC ............ *F16C 33/765* (2013.01); *G01P 3/443* (2013.01); *F16C 19/186* (2013.01); *F16C 19/525* (2013.01); *F16C 33/78* (2013.01); *F16C 2233/00* (2013.01); *F16C 2326/02* (2013.01)

(58) Field of Classification Search
CPC .... F16C 33/78; F16C 41/007; F16C 2233/00; F16C 2326/02; G01P 3/443; G01P 3/487; G01P 3/488
USPC ......................... 384/448, 484, 537, 544, 589; 324/207.25, 219, 519, 750.03, 76.11; 340/501, 517, 523
See application file for complete search history.

(56) References Cited

U.S. PATENT DOCUMENTS

| | | | | |
|---|---|---|---|---|
| 8,237,431 B2 * | 8/2012 | Fruehling | ........... | F16C 33/7859 324/207.25 |
| 2003/0093188 A1 * | 5/2003 | Morita | ................ | F16C 41/008 701/1 |
| 2017/0291204 A1 * | 10/2017 | Gouko | ................. | B21B 38/006 |
| 2018/0017052 A1 * | 1/2018 | Naka | ....................... | F04B 51/00 |
| 2019/0309810 A1 * | 10/2019 | Sabeti | ..................... | B60T 8/329 |

FOREIGN PATENT DOCUMENTS

| | | | | | |
|---|---|---|---|---|---|
| CN | 106481656 | A | * | 3/2017 | .............. F16C 41/00 |
| CN | 206246515 | U | * | 6/2017 | .............. F16C 41/00 |
| CN | 107209033 | A | * | 9/2017 | ........... B81B 7/0054 |
| CN | 207166316 | U | * | 3/2018 | .............. H02K 5/18 |
| EP | 2 544 010 | A1 | | 1/2013 | |
| JP | 2003-113835 | A | | 4/2003 | |
| JP | 2007-40917 | A | | 2/2007 | |
| JP | 4114334 | B2 | * | 7/2008 | ........... F16C 41/004 |
| JP | 2008-223843 | A | | 9/2008 | |
| JP | 2009-174705 | A | | 8/2009 | |
| JP | 4639282 | B2 | | 2/2011 | |
| JP | 2013-57659 | A | | 3/2013 | |
| JP | 2013-61030 | A | | 4/2013 | |
| JP | 2013-72703 | A | | 4/2013 | |
| JP | 5327305 | B2 | * | 10/2013 | .............. F16C 19/06 |
| JP | 2014-72256 | A | | 4/2014 | |
| JP | 2015094454 | A | * | 5/2015 | .............. F16C 19/52 |
| JP | 2017053382 | A | * | 3/2017 | ........... F16C 33/723 |
| JP | 6110525 | B1 | * | 4/2017 | .............. G01H 1/00 |
| JP | 6215569 | B2 | * | 10/2017 | ........... F16C 33/586 |
| RU | 2542941 | C2 | * | 2/2015 | .............. F16C 17/22 |
| WO | WO-2012098980 | A1 | * | 7/2012 | ........... F16C 41/004 |
| WO | WO-2019052619 | A1 | * | 3/2019 | .............. F16C 19/52 |

OTHER PUBLICATIONS

Written Opinion of the International Searching Authority for PCT/JP2018/029225 dated, Oct. 23, 2018 (PCT/ISA/237).

* cited by examiner

BEARING WITH MEASUREMENT FUNCTION

CROSS REFERENCE TO RELATED APPLICATIONS

This application is a National Stage of International Application No. PCT/JP2018/029225 filed Aug. 3, 2018, claiming priority based on Japanese Patent Application No. 2017-173877, filed Sep. 11, 2017 the disclosures of which are incorporated herein in their entirety by reference.

TECHNICAL FIELD

This invention relates to a bearing with a measurement function.

BACKGROUND ART

A bearing is an element member for use in a mechanical system carrying out a rotational motion, such as wind power generation and a vehicle, and has a very important role on achieving a high-efficiency mechanical motion by reducing friction during the rotational motion. At the same time, if performance degradation or damage of the bearing occurs, a significant adverse effect is exerted on driving of the mechanical system. Therefore, for the purpose of detection of bearing malfunction and preventive maintenance, efforts for monitoring a state by furnishing the bearing with various sensors are recently widespread.

Among others, measurement of heat generation in the bearing is very important for the preventive maintenance. If the heat generation caused by friction at the bearing is measured in real time, control of grease input and detection of malfunction and performance degradation of the bearing become possible to bring a merit for a business operator. Actually, a bearing provided with a thermocouple type temperature sensor (Patent Literature 1), a bearing provided with a rotational sensor (Patent Literature 2, Patent Literature 3), and so on are reported.

CITATION LIST

Patent Literature

PTL 1: JP 2013-57659 A
PTL 2: JP 2013-61030 A
PTL 3: JP 4639282 B

SUMMARY OF INVENTION

Technical Problem

However, the above-mentioned well-known techniques of detecting heat generation and a rotation rate in the bearing have three problems which will be described in the following.

Firstly, what is really desired to be measured by a temperature sensor is a contact portion between a shaft and the bearing (or between balls and a supporting ring). However, because the sensor cannot be directly mounted to the contact portion, it is impossible to measure accurate temperature in a frictional portion.

Secondly, a signal of the temperature sensor depends on outside temperature and ambient thermal capacity. It is therefore impossible to measure a heating value in a bearing portion in real time.

And thirdly, the mounted temperature sensor may possibly impede a thermal flow or disturb a mechanical balance to result in an adverse effect on the performance of the bearing itself.

It is an object of this invention to provide a bearing with a measurement function, which is capable of resolving any of the above-mentioned problems.

Solution to Problem

A bearing with a measurement function according to an example embodiment of the present invention comprises an outer ring secured to a securing member and an inner ring provided on an inside of the outer ring, the inner ring being secured to a shaft that rotates in a circumferential direction relative to the securing member, wherein the bearing comprises a thermal flow sensor provided as a coating on a securing-side surface that includes the outer ring, the thermal flow sensor being configured to generate a thermoelectromotive force including information about frictional heat generated with rotation of the shaft.

Advantageous Effect of the Invention

According to this invention, it is possible to simply grasp information about heat generation in a bearing.

DESCRIPTION OF EMBODIMENTS

Now, description will proceed to example embodiments of the present invention.

A bearing with a measurement function according to an example embodiment of the present invention is characterized by providing a spin Seebeck thermoelectric element as a coating on an outside of a bearing, and by monitoring information of frictional heat generated with rotation of a shaft by using a thermoelectromotive force (voltage) signal.

A bearing with a measurement function according to a first example embodiment of the present invention has a configuration in which a thermal flow sensor is provided as a coating on the outside of the bearing. A thermal flow generated by frictional heat generation in a bearing portion is measured by converting, in the thermal flow sensor, the thermal flow into an electromotive force (voltage) signal in a direction of a film surface. The thermal flow sensor comprises, for example, a layered structure of a magnetic film and a metal film.

A bearing with a measurement function according to a second example embodiment of the present invention measures not only the thermal flow but also temperature by utilizing the above-mentioned metal film as a resistance thermometer. By grasping the thermal flow (temperature gradient) and the temperature simultaneously, it is possible to more accurately grasp the temperature of a frictional heat generating portion inside the bearing by using the thermal flow sensor as a coating on the outside of the bearing.

A bearing with a measurement function according to a third example embodiment of the present invention comprises a magnetic encoder in which permanent magnets having different magnetization directions are alternately arranged on the side of a rotational shaft along a rotation direction. By a magnetic field generated by the magnetic encoder, the magnetic film constituting the thermal flow sensor is reversed in magnetization. Thus, information of a rotation rate of the shaft is acquired in addition to the information of heat generation.

Example 1

Figure 1A:
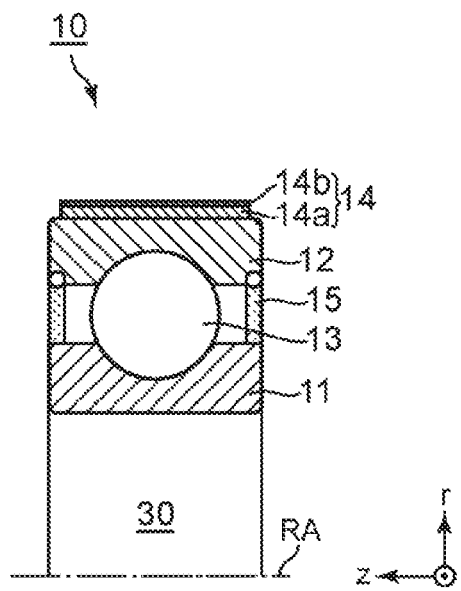
FIG. 1A is a fragmentary longitudinal sectional view of an antifriction bearing with a heat generation measurement function according to a first example of the present invention.
Figure 1B:
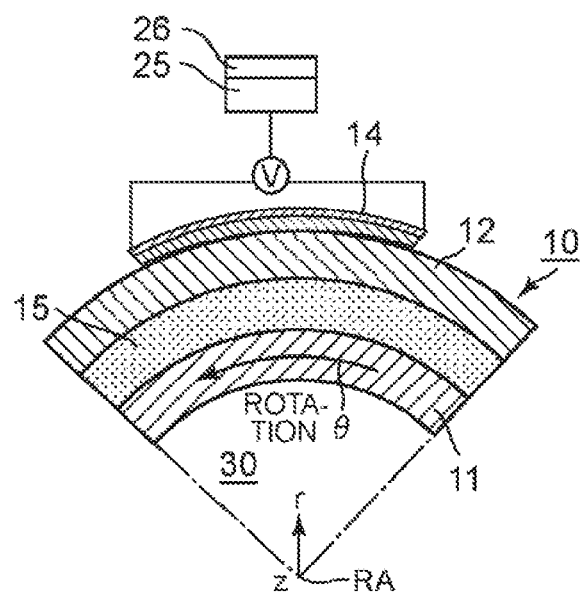
FIG. 1B is a fragmentary transverse sectional view of the antifriction bearing with the heat generation measurement function illustrated in FIG. 1A.

FIGS. 1A and 1B are views for illustrating an antifriction bearing 10 with a heat generation measurement function according to a first example of the present invention. FIG. 1A is a fragmentary longitudinal sectional view of the antifriction bearing 10 with the heat generation measurement function whereas FIG. 1B is a fragmentary transverse sectional view of the antifriction bearing 10 with the heat generation measurement function.

Herein, as shown in FIGS. 1A and 1B, a cylindrical coordinate system (r, θ, Z) is used. In a state illustrated in FIGS. 1A and 1B, in the cylindrical coordinate system (r, θ, Z), r is a radial direction with a rotational axis RA as an origin (a center), θ is a rotational direction (a circumferential direction) of rotation around the rotational axis RA as the center, and Z is an axial direction in which the rotational axis RA extends.

The antifriction bearing 10 with the heat generation measurement function according to this example comprises an inner ring 11, an outer ring 12, balls (rolling elements) 13, a spin thermal flow sensor 14, and a pair of sealing portions 15.

This example has a mechanism in which the outer ring 12 is secured to a securing member (not shown) and the inner ring 11 rotates. That is, the inner ring 11 is secured to a rotary member (shaft) 30 which rotates in the circumferential direction with respect to the securing member. The rotary member (shaft) 30 extends in the axial direction Z which is a direction of the rotational axis RA.

A plurality of balls (rolling elements) 13 are arranged between the inner ring 11 and the outer ring 12.

The pair of sealing portions 15 are made of a synthetic rubber material or the like. The pair of sealing portions 15 are disposed between the inner ring 11 and the outer ring 12 on an outer peripheral side of the balls (the rolling elements) 13 and each sealing portion has a ring shape. One side (outer peripheral end side) of each sealing portion 15 is secured to the outer ring 12 whereas the other side (inner peripheral end side) is closely contacted with the inner ring 11 so as to be pressed against the inner ring due to an elastic force. By adopting such a configuration, the pair of sealing portions 15 hermetically seal an inside of the bearing.

The spin thermal flow sensor 14 is a layered device which comprises a magnetic film having magnetization in an in-plane direction. The spin thermal flow sensor 14 is characterized by generating an electromotive force in the in-plane direction in proportion to an amount of a thermal flow flowing in a direction perpendicular to the plane on the basis of a thermomagnetic effect of converting a thermal flow in a magnetic substance into a spin current.

In the example shown in FIGS. 1A and 1B, the spin thermal flow sensor 14 comprises a magnetic substance film 14a and a conductive film 14b. The spin thermal flow sensor 14 is disposed so that those films are stacked as a coating on a surface of the outer ring 12 in the radial direction r.

Specifically, the magnetic substance film 14a is provided as a coating on the surface of the outer ring 12. The conductive film 14b is provided as a coating on a surface of the magnetic substance film 14a.

Herein, when heat generation occurs due to friction in the inside of the bearing (specifically, between the balls 13 and the outer ring 12 and between the balls 13 and the inner ring 11), the thermal flow flows to the spin thermal flow sensor 14 through the outer ring 12. Due to a spin Seebeck effect (which is one of thermomagnetic effects of converting the thermal flow into the spin current) induced from the thermal flow, the spin current occurs in the magnetic substance film 14a. When the spin current reaches the conductive film 14b, the spin current is converted into the electromotive force due to an inverse spin-Hall effect (which is an effect of converting the spin current into an electric current) in the conductive film 14b. By measuring such a generated electromotive force as an output voltage V between both ends of the conductive film 14b, it is possible to detect the heat generation caused in the bearing 10.

As the above-mentioned magnetic substance film 14a, an oxide magnetic material may be used, for example, yttrium iron garnet (YIG:$Y_3Fe_5O_{12}$), yttrium iron garnet doped with a rare-earth element such as Bi (Bi:YIG, $BiY_2Fe_5O_{12}$, etc.), Co ferrite ($CoFe_2O_4$), magnetite ($Fe_3O_4$), and so on. In addition, as the conductive film 14b, a conductive material having a large spin orbit interaction may be desirably used, for example, a metallic material such as Pt, W, or the like, an alloy such as FePt, CoPt, NiPt, FeW, CoW, or NiW, or a conductive oxide material such as $RuO_2$, and so on.

The magnetic substance film 14a may be formed by a coating method such as a metal organic decomposition method (MOD method), a ferrite plating method, sputtering, liquid-phase epitaxial growth (LPE), chemical vapor deposition (CVD), or the like. On the other hand, the conductive film 14b may be formed by a sputtering method, a pulse laser deposition method (PLD method), an electron-beam vapor deposition method, a plating method, or the like.

Furthermore, on the outside of the bearing 10, a control circuit 25 and a transmission/reception device 26 are provided so as to enable communication with the outside wirelessly. An operation mode of the control circuit 25 can be set wirelessly from the outside. Accordingly, a combination of the control circuit 25 and the transmission/reception device 26 serves as communicating means which is connected to the spin thermal flow sensor 14 to carry out communication with the outside wirelessly.

Now, description will proceed to an example of the operation mode of the communicating means. In ordinary times, results of measurement of the thermal flow (data of the observed voltage V) are temporarily saved in the control circuit 25 and the transmission/reception device 26 transmits the saved data to the outside every five minutes. On the other hand, when the thermal flow (the output voltage) exceeds a predetermined threshold, the control circuit 25 considers occurrence of malfunction and informs a supervisor of the malfunction by immediately performing wireless communication via the transmission/reception device 26. It is assumed that the similar control circuit 25, the similar transmission/reception device 26, and the similar operation method are used also in examples which will hereinafter be described.

As the above-mentioned spin thermal flow sensor, a magnetic conductor film with magnetism and conductivity may be used in lieu of the configuration comprising the magnetic substance film 14a and the conductive film 14b. In a case of using the magnetic conductor film also, an electromotive force similarly occurs due to an anomalous Nernst effect (which is one of the thermomagnetic effects of converting the thermal flow into a spin polarized current) caused by the thermal flow flowing into the magnetic conductor film. By measuring an output voltage signal between both ends of the magnetic conductor film, it is possible to detect the heat generation caused in the bearing 10.

As a material of the magnetic conductor film, not only Fe, Ni, Co but also an alloy such as FePt, CoPr, NiPt, FeW, CoW, or NiW may be used.

The first example exhibits an effect that the frictional heat generation in the inside of the bearing can be monitored by measuring the output voltage V.

Although communication with the outside is carried out wirelessly using the communicating means in the first example, the communication is not necessarily carried out wirelessly in the present invention. This is because the spin thermal flow sensor 14 is disposed on a fixed side (the surface of the outer ring 12 in this example) and it is therefore possible to communicate with the outside via wire from the spin thermal flow sensor 14.

Figure 2A:
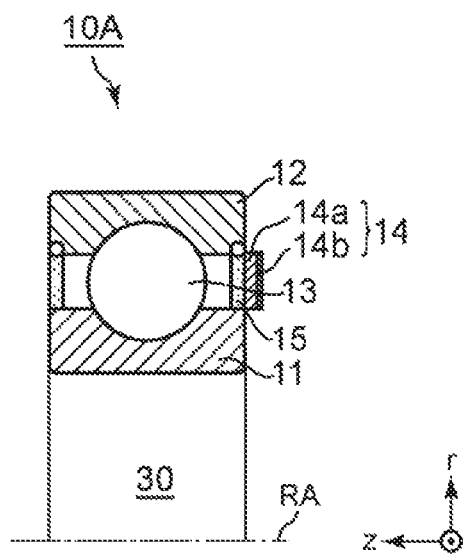
FIG. 2A is a fragmentary longitudinal sectional view of an antifriction bearing with a heat generation measurement function according to a variation of the first example of the present invention.
Figure 2B:
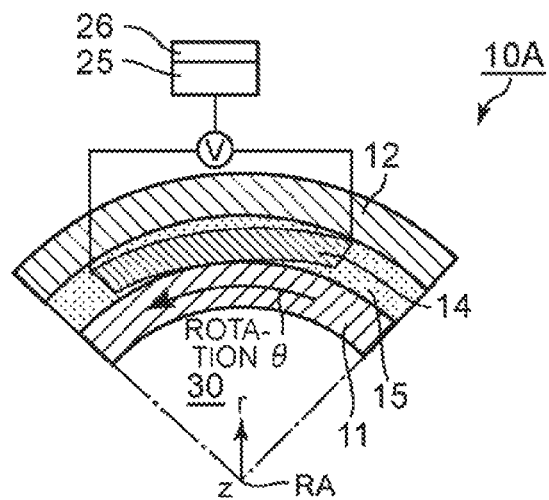
FIG. 2B is a fragmentary transverse sectional view of the antifriction bearing with the heat generation measurement function illustrated in FIG. 2A.

FIGS. 2A and 2B are views for illustrating an antifriction bearing 10A with a heat generation measurement function according to a variation of this example. FIG. 2A is a fragmentary longitudinal sectional view of the antifriction bearing 10A with the heat generation measurement function whereas FIG. 2B is a fragmentary transverse sectional view of the antifriction bearing 10A with the heat generation measurement function.

In FIGS. 2A and 2B also, a cylindrical coordinate system (r, θ, Z) is used like in FIGS. 1A and 1B.

Although components are similar to those of the bearing 10 in FIGS. 1A and 1B, the bearing 10A in FIGS. 2A and 2B is different in that the spin thermal flow sensor 14 is not mounted on the surface of the outer ring 12 but is mounted on a surface of the sealing portion 15.

In this variation, by using the ferrite plating method, the magnetic substance film 14a and the conductive film 14b are stacked as a coating on the surface of the sealing portion 15 in the axial direction Z.

This variation also exhibits an effect that the frictional heat generation in the inside of the bearing can be monitored by measuring the output voltage V.

Example 2

Figure 3A:
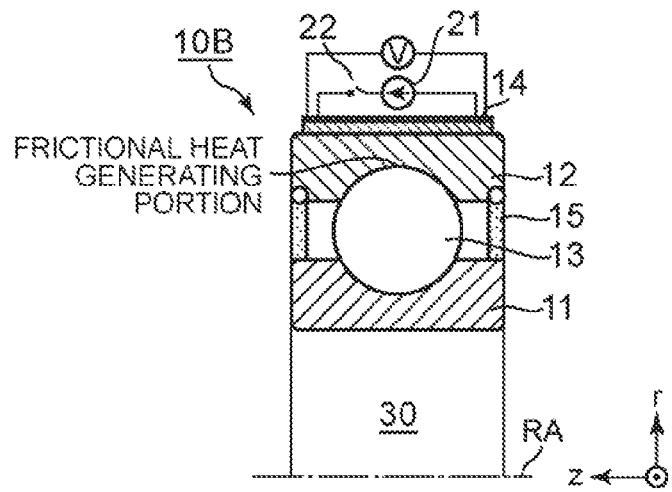
FIG. 3A is a fragmentary longitudinal sectional view for illustrating a state of an antifriction bearing with a bearing internal temperature measurement function according to a second example of the present invention in a thermal flow (temperature gradient) measurement mode.
Figure 3B:
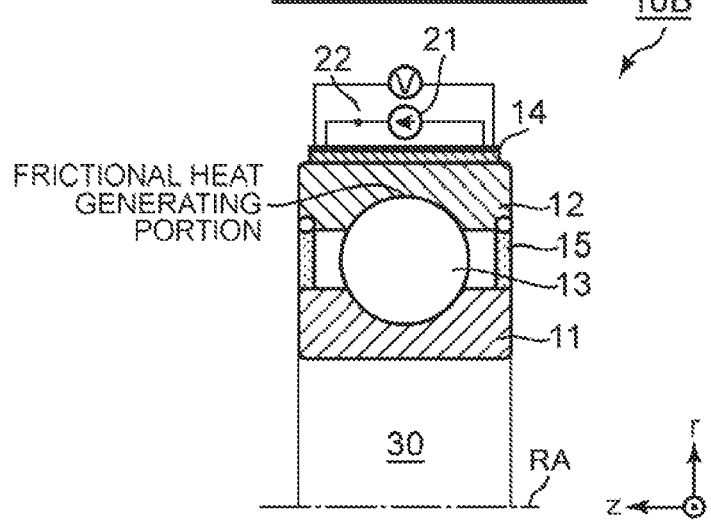
FIG. 3B is a fragmentary longitudinal sectional view for illustrating a state of the antifriction bearing with the bearing internal temperature measurement function illustrated in FIG. 3A in a temperature measurement mode.

FIGS. 3A and 3B are views for illustrating an antifriction bearing 10B with a bearing internal temperature measurement function according to a second example of the present invention. FIG. 3A is a fragmentary longitudinal sectional view for illustrating a state of the antifriction bearing 10B with the bearing internal temperature measurement function in a thermal flow (temperature gradient) measurement mode. FIG. 3B is a fragmentary longitudinal sectional view for illustrating a state of the antifriction bearing with the bearing internal temperature measurement function in a temperature measurement mode.

In FIGS. 3A and 3B also, a cylindrical coordinate system (r, θ, Z) is used like in FIGS. 1A and 1B.

In the second example of the present invention, measurement of temperature, in addition to the thermal flow, is carried out by utilizing the above-mentioned conductive film 14b as a resistance thermometer. By grasping the thermal flow (temperature gradient) and the temperature simultaneously, it is possible to more accurately evaluate the temperature of the frictional heat generating portion in the inside of the bearing.

Although a basic configuration is same as that of the antifriction bearing 10 with the heat generation measurement function according to the first example illustrated in FIGS. 1A and 1B, a direct-current source 21 and a switch 22 are newly introduced in the antifriction bearing 10B with the bearing internal temperature measurement function.

The direct-current source 21 and the switch 22 are connected in series to the spin thermal flow sensor 14.

As shown in FIG. 3A, when the switch 22 is turned off, an amount of the thermal flow caused by the frictional heat generation in the bearing 10B is measured through an output voltage between both ends of the conductive film 14b constituting the spin thermal flow sensor 14 (the thermal flow measurement mode) in the manner similar to the first example.

On the other hand, as shown in FIG. 3B, when the switch 22 is put into an ON state, a constant current flows from the direct-current source 21 into the conductive film 14b of the spin thermal flow sensor 14, so that the above-mentioned output voltage V changes. The amount of change is proportional to a product of the above-mentioned constant current and a resistance of the conductive film 14b. From the above, it is possible to evaluate a change in resistance of the conductive film 14b by observing the amount of change. Since resistivity monotonously depends on the temperature in most of conductive materials, it is possible to measure the temperature of the conductive film 14b (the temperature measurement mode).

By alternately repeating the thermal flow measurement mode and the temperature measurement mode, it is possible to more accurately evaluate the temperature in the frictional heat generating portion.

Generally, in the bearing, heat generation occurs mainly in a frictional portion between the outer ring 12 and the balls 13. However, in view of a mechanical design, it is difficult to directly mount a temperature sensor at this portion. From the above, it is impossible, according to a common, generally known method, to directly evaluate the temperature in the frictional heat generating portion.

As opposed thereto, by means of the antifriction bearing 10B with the bearing internal temperature measurement function illustrated in FIGS. 3A and 3B, it is possible to evaluate absolute temperature of the surface of the outer ring 12 and the amount of thermal flow (which is proportional to the temperature gradient) flowing therethrough.

Figure 4:
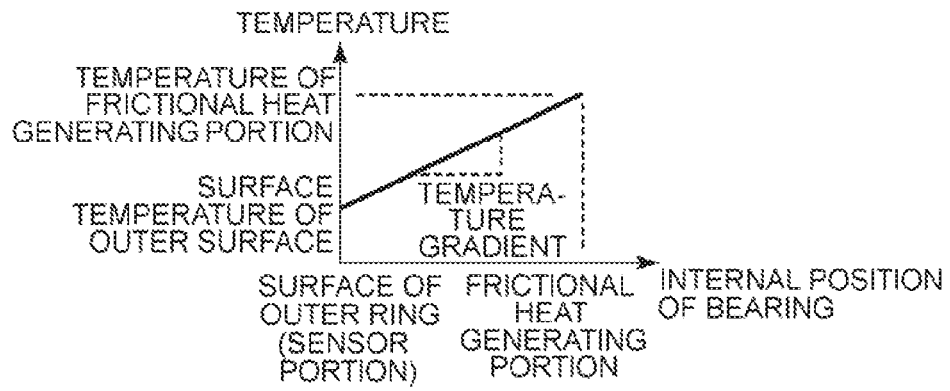
FIG. 4 is a view for use in describing a method of estimating internal temperature by using the antifriction bearing with the bearing internal temperature measurement function illustrated in FIGS. 3A and 3B.

FIG. 4 is a view for use in describing a method of estimating the internal temperature by using these two parameters. In FIG. 4, the abscissa represents an internal position of the bearing, and the ordinate represents temperature. FIG. 4 represents that it is possible to estimate the internal temperature in the frictional heat generating portion based on surface temperature of the outer ring and the temperature gradient.

As described above, the second example exhibits an effect that it is possible to evaluate the temperature of the frictional heat generating portion (the contact portion between the outer ring 12 and balls 13) in the inside of the bearing.

Figure 5A:
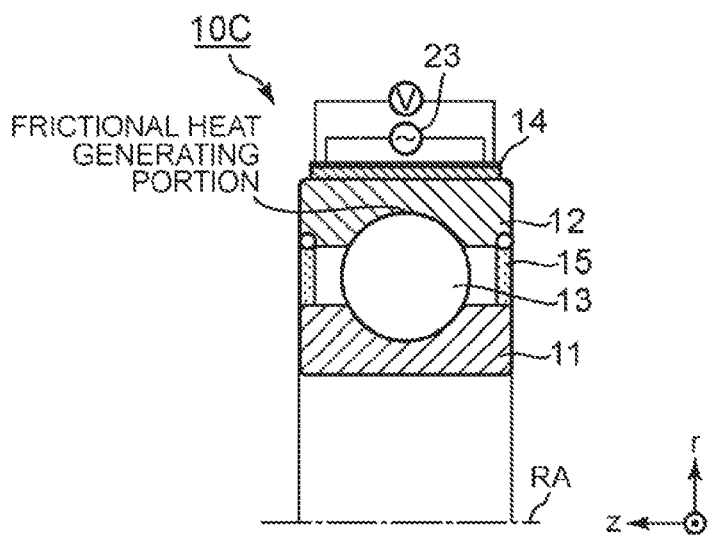
FIG. 5A is a fragmentary longitudinal sectional view for illustrating an antifriction bearing with a bearing internal temperature measurement function in order to describe another sensing method of the second example of the present invention.
Figure 5B:
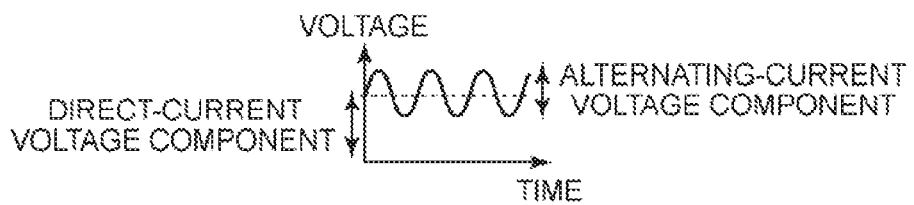
FIG. 5B is a waveform chart for illustrating fluctuation of an output voltage in the antifriction bearing with the bearing internal temperature measurement function illustrated in FIG. 5A.

FIGS. 5A and 5B are views for use in describing another sensing method of the second example of the present invention. FIG. 5A is a fragmentary longitudinal sectional view for illustrating an antifriction bearing 10C with a bearing internal temperature measurement function whereas FIG. 5B is a waveform chart for illustrating fluctuation of an output voltage.

In this method, as shown in FIG. 5A, an alternating-current source 23 is used in lieu of using the direct-current source 21 in FIG. 3 and the switch 22 is deleted.

By adopting such a configuration, as shown in FIG. 5B, the output voltage V is generated as a sum of a direct-current voltage component proportional to the thermal flow (the temperature gradient) and an alternating-current voltage component depending on the resistance determined by the absolute temperature. From the above, by separately evaluating those components, it is possible to simultaneously carry out the measurement of the thermal flow (the temperature gradient) and the measurement of the absolute temperature.

Another sensing method illustrated in FIGS. 5A and 5B also provides, in addition to the effect of the above-mentioned second example, an effect that element configuration is simplified because the switch 22, which is required to switch the measurement modes in the antifriction bearing 10B with the bearing internal temperature measurement function illustrated in FIGS. 3A and 3B, is unnecessary.

Example 3

Figure 6A:
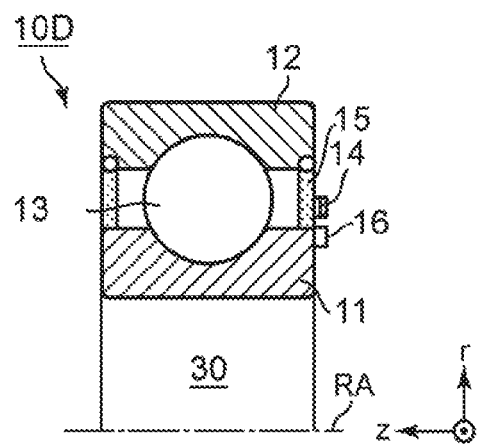
FIG. 6A is a fragmentary longitudinal sectional view of an antifriction bearing with a rotation rate and heat generation measurement function according to a third example of the present invention.
Figure 6B:
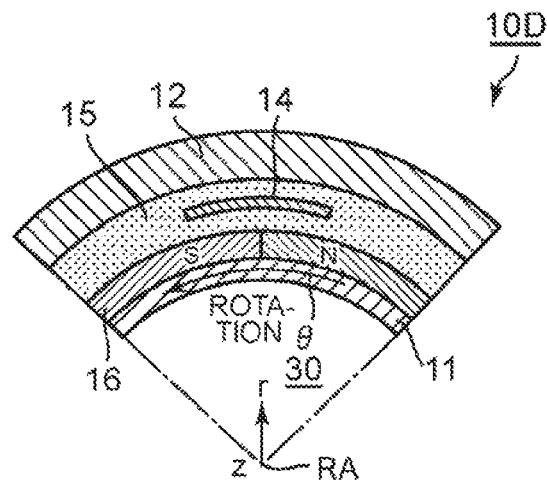
FIG. 6B is a fragmentary transverse sectional view of the antifriction bearing with the rotation rate and heat generation measurement function illustrated in FIG. 6A.

FIGS. 6A and 6B are views for illustrating an antifriction bearing 10D with a rotation rate and heat generation measurement function according to a third example of the present invention. FIG. 6A is a fragmentary longitudinal sectional view of the antifriction bearing 10D with the rotation rate and heat generation measurement function whereas FIG. 6B is a fragmentary transverse sectional view of the antifriction bearing 10D with the rotation rate and heat generation measurement function.

In FIGS. 6A and 6B also, a cylindrical coordinate system (r, θ, Z) is used like in FIGS. 1A and 1B.

In the third example of the present invention, a plurality of permanent magnets having alternately different magnetic poles are arranged on the side of the inner ring 11 of the bearing 10D along the rotational direction θ and, by a magnetic field generated thereby, the magnetic substance film of a spin Seebeck element on the side of the bearing is reversed in magnetization. Thus, in the third example, rotation information of the shaft is also acquired in addition to the heat generation information.

In the antifriction bearing 10D with the rotation rate and heat generation measurement function illustrated in FIGS. 6A and 6B, a magnetic encoder 16 is secured on the side of the inner ring 11 in addition to a configuration similar to that of the bearing 10A illustrated in FIGS. 2A and 2B. The magnetic encoder 16 has a configuration that the permanent magnets with alternately oriented magnetic poles (N pole and S pole) are arranged along the rotational direction θ.

Figure 7:
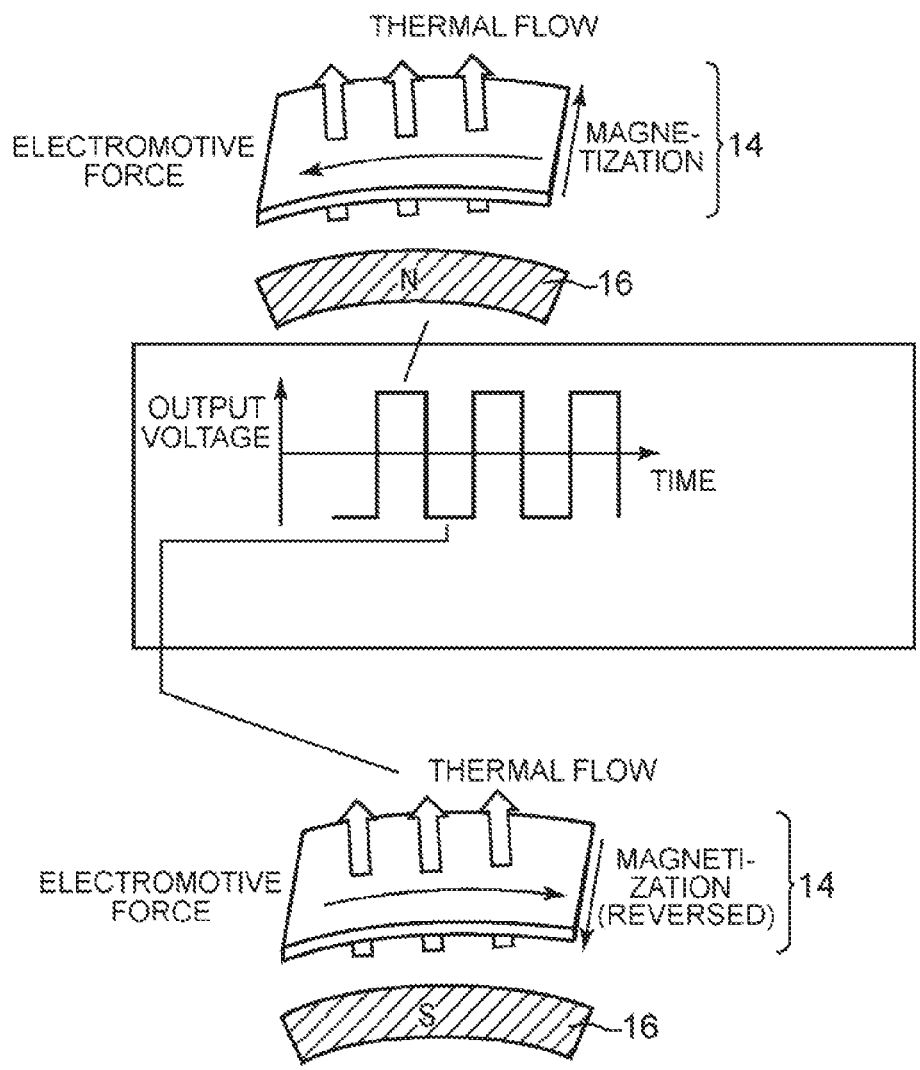
FIG. 7 is a view for use in describing an operation principle of the antifriction bearing with the rotation rate and heat generation measurement function illustrated in FIGS. 6A and 6B.

FIG. 7 is a view for use in describing an operation principle of the antifriction bearing 10D with the rotation rate and heat generation measurement function illustrated in FIGS. 6A and 6B.

By adopting such a configuration, with a relative rotational motion between the inner ring 11 and the outer ring 12, a magnetization direction of the spin thermal flow sensor 14 reverses on every rotation due to the magnetic field generated by the permanent magnets of the magnetic encoder 16. From the above, as a result, the output voltage V is also reversed in sign (FIG. 7). Accordingly, in the third example, a rotational frequency of the rotational motion can be evaluated on the basis of a frequency of the output voltage V.

As described above, the third example exhibits an effect that the information of the rotation rate of the shaft 30 can be acquired in addition to the heat generation information.

In the above-mentioned third example, measurement of the frequency is enabled only by disposing one spin thermal flow sensor 14. On the other hand, by disposing two spin thermal flow sensors at suitable positions (e.g. positions separated by 90 degrees in the rotational direction θ), it is possible to evaluate not only the rotational frequency but also a direction of rotation and a relative position (rotational angle) between the inner ring and the outer ring at a particular time.

Figure 8A:
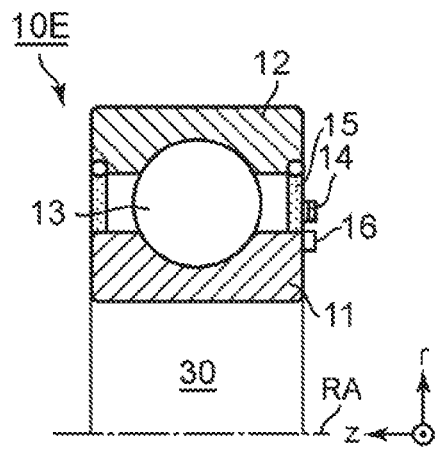
FIG. 8A is a fragmentary longitudinal sectional view of an antifriction bearing with a rotation rate and heat generation measurement function according to a variation of the third example of the present invention in a case of using a plurality of thermal flow sensors.
Figure 8B:
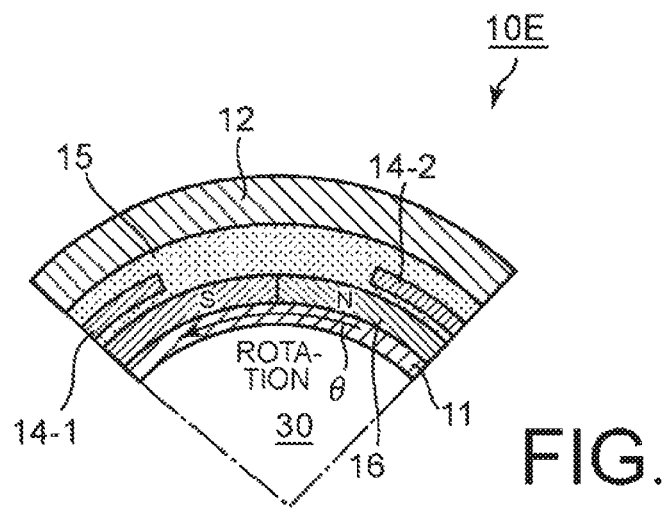
FIG. 8B is a fragmentary transverse sectional view of the antifriction bearing with the rotation rate and heat generation measurement function illustrated in FIG. 8A.

FIGS. 8A and 8B are views for illustrating an antifriction bearing 10E with a rotation rate and heat generation measurement function according to a variation of the third example in a case of using a plurality of thermal flow sensors. FIG. 8A is a fragmentary longitudinal sectional view of the antifriction bearing 10E with the rotation rate and heat generation measurement function whereas FIG. 8B is a fragmentary transverse sectional view of the antifriction bearing 10E with the rotation rate and heat generation measurement function.

In FIGS. 8A and 8B also, a cylindrical coordinate system (r, θ, Z) is used like in FIGS. 1A and 1B.

As shown in FIG. 8B, the antifriction bearing 10E with the rotation rate and heat generation measurement function comprises a first spin thermal flow sensor 14-1 and a second spin thermal flow sensor 14-2 which are disposed on the surface of the sealing portion 15 at positions apart from each other by 90 degrees in the rotational direction θ.

Figure 9:
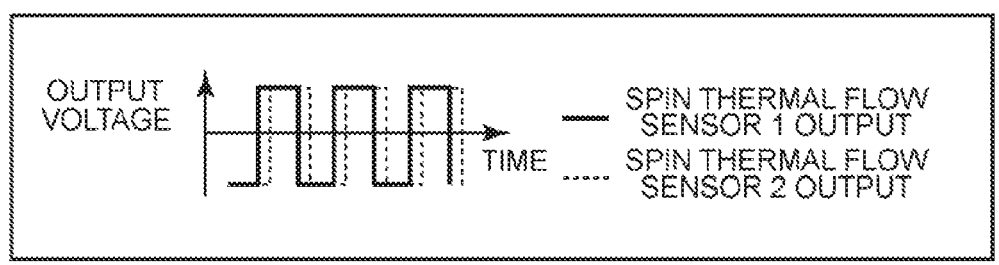
FIG. 9 is a waveform chart for illustrating outputs of first and second spin thermal flow sensors in the antifriction bearing with the rotation rate and heat generation measurement function illustrated in FIGS. 8A and 8B.

FIG. 9 is a waveform chart for illustrating an output of the first spin thermal flow sensor 14-1 and an output of the second spin thermal flow sensor 14-2. In FIG. 9, the output of the first spin thermal flow sensor 14-1 is depicted by "SPIN THERMAL FLOW SENSOR 1 OUTPUT" in a solid line whereas the output of the second spin thermal flow sensor 142 is depicted by "SPIN THERMAL FLOW SENSOR 2 OUTPUT" in a broken line.

As apparent from FIG. 9, by observing relative outputs of a plurality of sensors 14-1 and 14-2, it is possible to detect an angle (position) of the rotation at a certain moment more finely.

In this variation, as will be understood from FIG. 9, the outputs of the plurality of sensors 14-1 and 14-2 do not form a sinusoidal wave but forms a square wave. By distinguishing four combinations of (sign of sensor 1, sign of sensor 2)=(+, +), (+, −), (−, +), (−, −), it is possible to find in which area the position is located at that moment. In addition, it is possible to further improve accuracy by increasing the number of sensors.

The variation illustrated in FIGS. 8A and 8B also exhibits, in addition to the effect of the above-mentioned third example, an effect that it is possible to also detect the direction of rotation and the relative position (the rotation angle).

Example 4

Figure 10A:
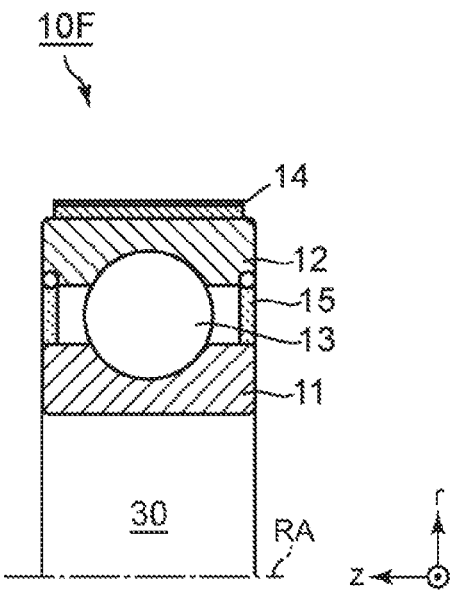
FIG. 10A is a fragmentary longitudinal sectional view of a self-driven type antifriction bearing with a heat generation measurement function according to a fourth example of the present invention.
Figure 10B:
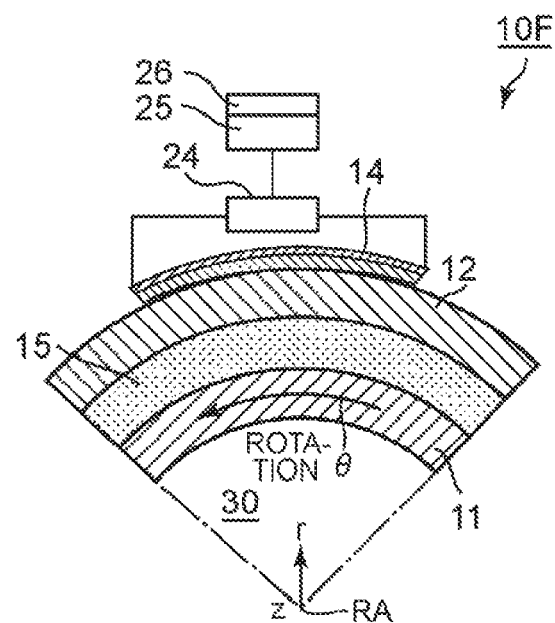
FIG. 10B is a fragmentary transverse sectional view of the self-driven type antifriction bearing with the heat generation measurement function illustrated in FIG. 10A.

FIGS. 10A and 10B are views for illustrating a self-driven type antifriction bearing 10F with a heat generation measurement function according to a fourth example of the present invention. FIG. 10A is a fragmentary longitudinal sectional view of the self-driven type antifriction bearing 10F with the heat generation measurement function whereas FIG. 10B is a fragmentary transverse sectional view of the self-driven type antifriction bearing 10F with the heat generation measurement function.

In FIGS. 10A and 10B also, a cylindrical coordinate system (r, θ, Z) is used like in FIGS. 1A and 1B.

The fourth example comprises a capacitor 24 for accumulating the thermoelectromotive force as electric power in addition to the above-mentioned configuration of the antifriction bearing 10 with the heat generation measurement function according to the first example illustrated in FIGS. 1A and 1B. That is, in the fourth example, it is possible to independently drive itself without an external battery or power supply from the outside and to transmit sensing data to the outside wirelessly.

As described above, the fourth example exhibits an effect that it is possible to transmit sensing data to the outside wirelessly without power supply from the outside.

In the above-mentioned examples, a mounting method for the antifriction bearings, especially, ball bearings among various types of bearings has been described. However, in the present invention, similar mounting is possible with respect to other bearing systems (a sliding bearing, a roller bearing).

[Modification]

Figure 11A:
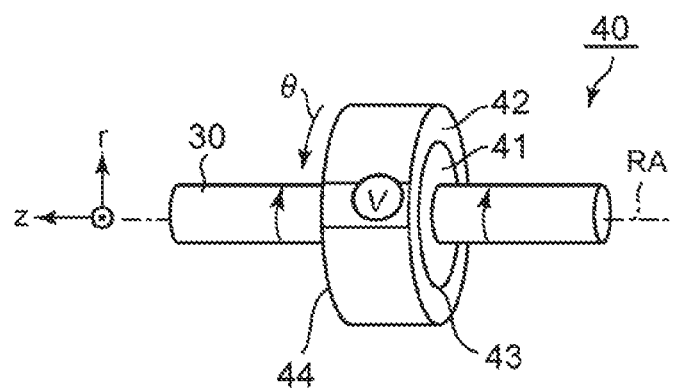
FIG. 11A is a schematic perspective view of a sliding bearing with a heat generation measurement function according to a modification of the present invention.
Figure 11B:
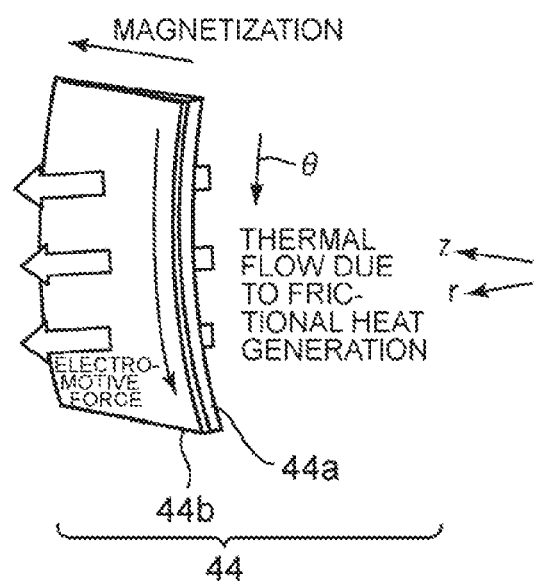
FIG. 11B is a perspective view for illustrating, in an enlarged state, a spin thermoelectric thermal flow sensor which is provided in the sliding bearing with the heat generation measurement function illustrated in FIG. 11A.

FIGS. 11A and 11B are views for illustrating a sliding bearing 40 with a heat generation measurement function according to a modification of the present invention. FIG. 11A is a schematic perspective view of the sliding bearing 40 with the heat generation measurement function whereas FIG. 11B is a perspective view for illustrating, in an enlarged state, a spin thermal flow sensor which is provided in the sliding bearing 40 with the heat generation measurement function.

Herein, as shown in FIGS. 11A and 11B, a cylindrical coordinate system (r, θ, Z) is used. In a state illustrated in FIGS. 11A and 11B, in the cylindrical coordinate system (r, θ, Z), r is a radial direction with a rotational axis RA as a center, θ is a rotational direction of rotation around the rotational axis RA, and Z is an axial direction in which the rotational axis RA extends.

The bearing 40 of this modification comprises an inner ring 41, an outer ring 42, and a spin thermal flow sensor 44. The outer ring 41 is secured to a securing member (not shown). The inner ring 42 is secured to a shaft 30 serving as a rotary member and is adapted to rotate. The outer ring 42 and the inner ring 41 are adapted to relatively rotate through a sliding surface 43.

That is, by a combination of the inner ring 41, the outer ring 42, and the sliding surface 43, the sliding bearing (41, 42, 43) is configured.

As shown in FIG. 11A, the sliding bearing 40 with the heat generation measurement function has a configuration, as an example, in which the spin thermal flow sensor 44 is disposed on a surface of the outer ring 42 as an outer peripheral portion of the sliding bearing (41, 42, 43).

As shown in FIG. 11B, the spin thermal flow sensor 44 comprises a magnetic film 44a and a metal film 44b and is disposed so that these films are stacked as a coating on the surface of the outer ring 42 in the radial direction r. The magnetic film 44a has magnetization in an in-plane direction (a direction parallel to the axial direction Z). The spin thermal flow sensor 44 generates an electromotive force in the in-plane direction (the rotational direction θ) in proportion to an amount of thermal flow which flows in a direction perpendicular to the plane (the radial direction r). By measuring such a generated electromotive force as an output voltage V between both ends of the metal film 44b, it is possible to detect heat generation caused in the sliding bearing (41, 42, 43).

As described above, the modification has an effect that it is possible to monitor the frictional heat generation in the inside of the sliding bearing (41, 42, 43) by measuring the output voltage V.

While the present invention has been described with reference to the example embodiments and the examples thereof, the present invention is not limited to the example embodiments and the examples mentioned above. It will be understood by those of ordinary skill in the art that various changes in configuration and details may be made within the scope of the present invention.

A whole or a part of the above-mentioned example embodiments may be described as, but not limited to, the following supplementary notes.

(Supplementary Note 1)

A bearing with a measurement function, comprising:

an outer ring secured to a securing member; and an inner ring provided on an inside of the outer ring, the inner ring being secured to a shaft that rotates in a circumferential direction relative to the securing member, wherein the bearing comprises a thermal flow sensor provided as a coating on a securing-side surface that includes the outer ring, the thermal flow sensor being configured to generate a thermoelectromotive force including information about frictional heat generated with rotation of the shaft.

(Supplementary Note 2)

The bearing with the measurement function according to Supplementary Note 1, wherein the thermal flow sensor is provided as a coating on a surface of the outer ring.

(Supplementary Note 3)

The bearing with the measurement function according to Supplementary Note 1, wherein the bearing comprises an antifriction bearing which comprises a plurality of rolling elements disposed between the outer ring and the inner ring, and a sealing portion secured to the outer ring to hermetically seal the plurality of rolling elements, wherein the thermal flow sensor is provided as a coating on a surface of the sealing portion.

(Supplementary Note 4)

The bearing with the measurement function according to any one of Supplementary Notes 1 to 3, wherein the thermal flow sensor comprises a film with at least one layer that exhibits a thermomagnetic effect.

(Supplementary Note 5)

The bearing with the measurement function according to Supplementary Note 4, wherein the thermal flow sensor comprises a magnetic substance film and a conductive film which exhibit a spin Seebeck effect as the thermomagnetic effect.

(Supplementary Note 6)

The bearing with the measurement function according to Supplementary Note 5, further comprising a measurement control means configured to enable thermal flow measurement and temperature measurement.

(Supplementary Note 7)

The bearing with the measurement function according to Supplementary Note 6, wherein the measurement control means comprises a direct-current source and a switch which are connected in series to the thermal flow sensor.

(Supplementary Note 8)

The bearing with the measurement function according to Supplementary Note 6, wherein the measurement control means comprises an alternating-current source connected to the thermal flow sensor.

(Supplementary Note 9)

The bearing with the measurement function according to Supplementary Note 4, wherein the thermal flow sensor comprises a magnetic conductor film with magnetism and conductivity that exhibits an anomalous Nernst effect as the thermomagnetic effect.

(Supplementary Note 10)

The bearing with the measurement function according to Supplementary Note 3, further comprising a magnetic encoder mounted to the inner ring so as to be in proximity to the thermal flow sensor.

(Supplementary Note 11)

The bearing with the measurement function according to Supplementary Note 3, wherein a plurality of thermal flow sensors are arranged apart from one another on the surface of the sealing portion.

(Supplementary Note 12)

The bearing with the measurement function according to any one of Supplementary Notes 1 to 11, further comprising communication means connected to the thermal flow sensor, the communication means being configured to communicate with the outside wirelessly.

(Supplementary Note 13)

The bearing with the measurement function according to Supplementary Note 12, further comprising a capacitor configured to accumulate the thermoelectromotive force as electric power.

REFERENCE SIGNS LIST 10, 10A: antifriction bearing with a heat generation measurement function
10B, 10C: antifriction bearing with a bearing internal temperature measurement function
10D, 10E: antifriction bearing with a rotation rate and heat generation measurement function
10F: self-driven type antifriction bearing with a heat generation measurement function
11: inner ring
12: outer ring
13: ball (rolling element)
14: spin thermal flow sensor
14-1: first spin thermal flow sensor
14-2: second spin thermal flow sensor
14a: magnetic substance film
14b: conductive film
15: sealing portion
16: magnetic encoder
21: direct-current source
22: switch
23: alternating-current source
24: capacitor
25: control circuit
26: transmission/reception device
30: rotary member (shaft)
40: sliding bearing with a heat generation measurement function
41: inner ring
42: outer ring
43: sliding surface
44: spin thermal flow sensor
44a: magnetic film
44b: metal film
RA: rotational axis
r: radial direction
θ: rotational direction (circumferential direction)
Z: axial direction
V: output voltage

The invention claimed is:

1. A bearing with a measurement function, comprising:
an outer ring secured to a securing member; and
an inner ring provided on an inside of the outer ring, the inner ring being secured to a shaft that rotates in a circumferential direction relative to the securing member,
wherein the bearing comprises a thermal flow sensor provided as a coating on a securing-side surface that includes the outer ring, the thermal flow sensor being configured to generate a thermoelectromotive force including information about frictional heat generated with rotation of the shaft,
wherein the thermal flow sensor comprises a film with at least one layer that exhibits a thermomagnetic effect,
wherein the thermal flow sensor comprises a magnetic substance film and a conductive film which exhibit a spin Seebeck effect as the thermomagnetic effect,
wherein the bearing further comprises a measurement control means configured to enable thermal flow measurement and temperature measurement.

2. The bearing with the measurement function as claimed in claim 1, wherein the thermal flow sensor is provided as a coating on a surface of the outer ring.

3. The bearing with the measurement function as claimed in claim 1,
wherein the bearing comprises an antifriction bearing which comprises a plurality of rolling elements disposed between the outer ring and the inner ring, and a sealing portion secured to the outer ring to hermetically seal the plurality of rolling elements,
wherein the thermal flow sensor is provided as a coating on a surface of the sealing portion.

4. The bearing with the measurement function as claimed in claim 3, further comprising a magnetic encoder mounted to the inner ring so as to be in proximity to the thermal flow sensor.

5. The bearing with the measurement function as claimed in claim 3, wherein a plurality of thermal flow sensors are arranged apart from one another on the surface of the sealing portion.

6. The bearing with the measurement function as claimed in claim wherein 1, the measurement control means comprises a direct-current source and a switch which are connected in series to the thermal flow sensor.

7. The bearing with the measurement function as claimed in claim 1, wherein the measurement control means comprises an alternating-current source connected to the thermal flow sensor.

8. The bearing with the measurement function as claimed in claim 1, further comprising communication means connected to the thermal flow sensor, the communication means being configured to communicate with the outside wirelessly.

9. The bearing with the measurement function as claimed in claim 8, further comprising a capacitor configured to accumulate the thermoelectromotive force as electric power.

10. A bearing with a measurement function, comprising:
an outer ring secured to a securing member; and
an inner ring provided on an inside of the outer ring, the inner ring being secured to a shaft that rotates in a circumferential direction relative to the securing member,
wherein the bearing comprises a thermal flow sensor provided as a coating on a securing-side surface that includes the outer ring, the thermal flow sensor being configured to generate a thermoelectromotive force including information about frictional heat generated with rotation of the shaft,
wherein the bearing comprises an antifriction bearing which comprises a plurality of rolling elements disposed between the outer ring and the inner ring, and a sealing portion secured to the outer ring to hermetically seal the plurality of rolling elements,
wherein the thermal flow sensor is provided as a coating on a surface of the sealing portion, and
wherein a plurality of thermal flow sensors are arranged apart from one another on the surface of the sealing portion.

11. A bearing with a measurement function, comprising:
an outer ring secured to a securing member; and
an inner ring provided on an inside of the outer ring, the inner ring being secured to a shaft that rotates in a circumferential direction relative to the securing member,
wherein the bearing comprises a thermal flow sensor provided as a coating on a securing-side surface that includes the outer ring, the thermal flow sensor being configured to generate a thermoelectromotive force including information about frictional heat generated with rotation of the shaft,
wherein the bearing further comprises communication means connected to the thermal flow sensor, the communication means being configured to communicate with the outside wirelessly, and
wherein the bearing further comprises a capacitor configured to accumulate the thermoelectromotive force as electric power.

* * * * *